(12) United States Patent
Beck

(10) Patent No.: US 12,529,545 B2
(45) Date of Patent: Jan. 20, 2026

(54) SOFT BODY ARMOR ASSEMBLY

(71) Applicant: TYR Tactical, LLC, Peoria, AZ (US)

(72) Inventor: Jason Beck, Peoria, AZ (US)

(73) Assignee: TYR Tactical, LLC, Peoria, AZ (US)

(*) Notice: Subject to any disclaimer, the term of this patent is extended or adjusted under 35 U.S.C. 154(b) by 25 days.

(21) Appl. No.: 18/446,378

(22) Filed: Aug. 8, 2023

(65) Prior Publication Data

US 2025/0052543 A1    Feb. 13, 2025

(51) Int. Cl.
*F41H 5/04* (2006.01)

(52) U.S. Cl.
CPC ................... *F41H 5/0478* (2013.01)

(58) Field of Classification Search
CPC ........................................... F41H 5/0478
USPC .......................................... 89/36.02
See application file for complete search history.

(56) References Cited

U.S. PATENT DOCUMENTS

| | | | |
|---|---|---|---|
| 2016/0236450 A1* | 8/2016 | Singletary | B32B 7/12 |
| 2016/0243790 A1* | 8/2016 | Singletary | B32B 37/10 |
| 2017/0138703 A1* | 5/2017 | Wadley | B32B 5/26 |
| 2019/0160782 A1* | 5/2019 | Harding | B32B 27/06 |

FOREIGN PATENT DOCUMENTS

| | | | | |
|---|---|---|---|---|
| WO | WO-2010138143 A1 * | 12/2010 | | B32B 5/024 |
| WO | WO-2020165212 A1 * | 8/2020 | | B29C 43/003 |

* cited by examiner

Primary Examiner — Samir Abdosh
(74) Attorney, Agent, or Firm — KW Law, LLP

(57) ABSTRACT

The present disclosure is direct to a soft body armor assembly that comprises a first subpanel and a second subpanel. The first subpanel may have a first portion and a second portion. The first portion may have a first plurality of ultra-high molecular weight polyethylene fiber sheets. Each sheet of the first plurality may have two single layers of unidirectional sheets cross plied at 90 degrees to one another. The second portion may have a second plurality of ultra-high molecular weight polyethylene fiber sheets. The second subpanel may comprise a third portion and a fourth portion. The third portion may have a third plurality of ultra-high molecular weight polyethylene fiber sheets. The fourth portion may have one or more composite sheets.

14 Claims, 18 Drawing Sheets

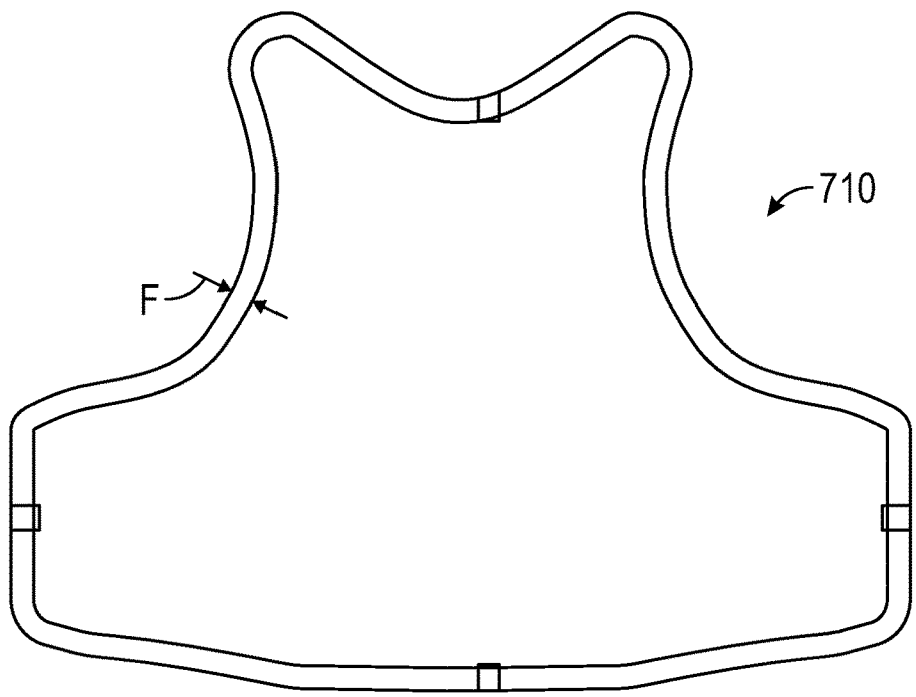
FIG. 8C
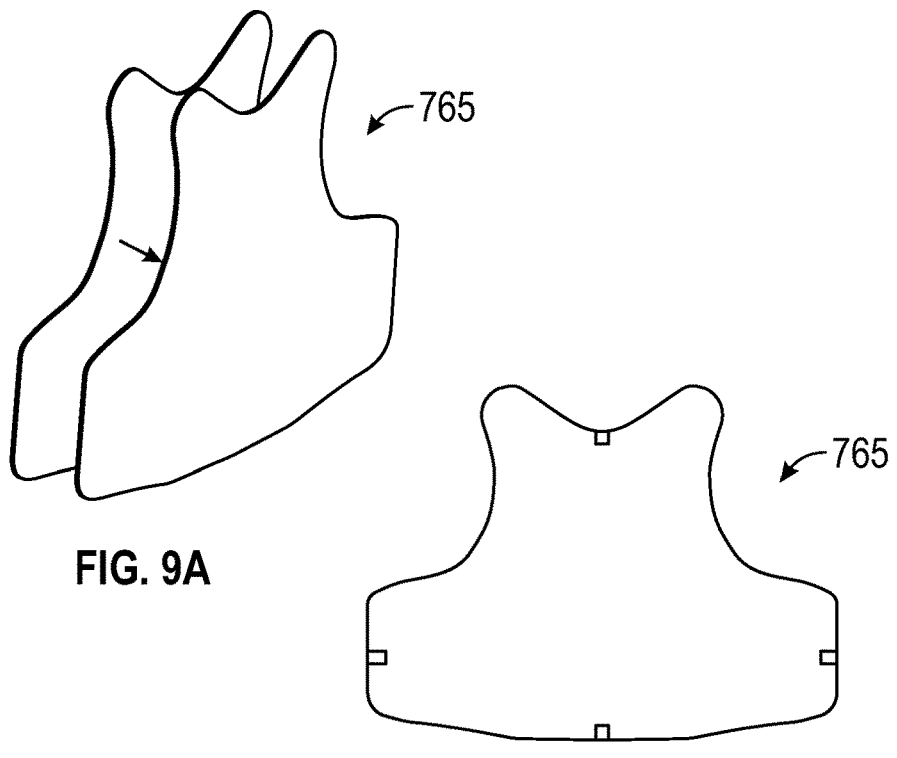
FIG. 9A
FIG. 9B

SOFT BODY ARMOR ASSEMBLY

CROSS-REFERENCE TO RELATED APPLICATIONS

The present patent application claims priority to and the benefit of International Application No. PCT/US22/16238 filed on Feb. 11, 2022 and entitled Soft Body Armor Assembly, and claims priority to and the benefit of U.S. Provisional Patent Application No. 63/148,278 filed on Feb. 11, 2021 and entitled Soft Body Armor Package, which are incorporated by reference herein in their entirety for any purpose.

TECHNICAL FIELD

Aspects of the present disclosure relate to a soft body armor assembly and more particularly to ballistic fabrics and sheets with cross plied fabrics with improved ballistic performance.

BACKGROUND

Ballistic protective equipment, including vests, carriers, belts, cummerbunds, ballistic accessories (e.g., shoulder protection, pouches, abdomen protection, groin protection, leg protection, bicep/deltoid upper arm protection, etc.) and the like are worn by a human or animal to absorb the impact from and resist penetration to the body from ballistic projectiles and shrapnel from explosions. Such ballistic protective equipment often includes soft body armor, which provides ballistic resistance while reducing an overall weight of the ballistic protective equipment.

SUMMARY

The present disclosure is direct to a soft body armor assembly that comprises a first subpanel and a second subpanel. The first subpanel may have a first portion and a second portion. The first portion may have a first plurality of ultra-high molecular weight polyethylene fiber sheets. Each sheet of the first plurality may have two single layers of unidirectional sheets cross plied at 90 degrees to one another. The second portion may have a second plurality of ultra-high molecular weight polyethylene fiber sheets. Each sheet of the second plurality may have two single layers of unidirectional sheets cross plied at 90 degrees to one another. The second subpanel may comprise a third portion and a fourth portion. The third portion may have a third plurality of ultra-high molecular weight polyethylene fiber sheets. Each sheet of the third plurality comprises two single layers of unidirectional sheets cross plied at 90 degrees to one another. The fourth portion may have one or more composite sheets.

Other implementations are also described and recited herein. Further, while multiple implementations are disclosed, still other implementations of the presently disclosed technology will become apparent to those skilled in the art from the following detailed description, which shows and describes illustrative implementations of the presently disclosed technology. As will be realized, the presently disclosed technology is capable of modifications in various aspects, all without departing from the spirit and scope of the presently disclosed technology. Accordingly, the drawings and detailed description are to be regarded as illustrative in nature and not limiting.

BRIEF DESCRIPTIONS OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

FIGS. 8A-8C illustrate various layups of a hybrid soft body armor assembly, in accordance with various embodiments; and FIGS. 9A-9I illustrate various additional layups of a hybrid soft body armor assembly, in accordance with various embodiments.

DETAILED DESCRIPTIONS

Figure 1:
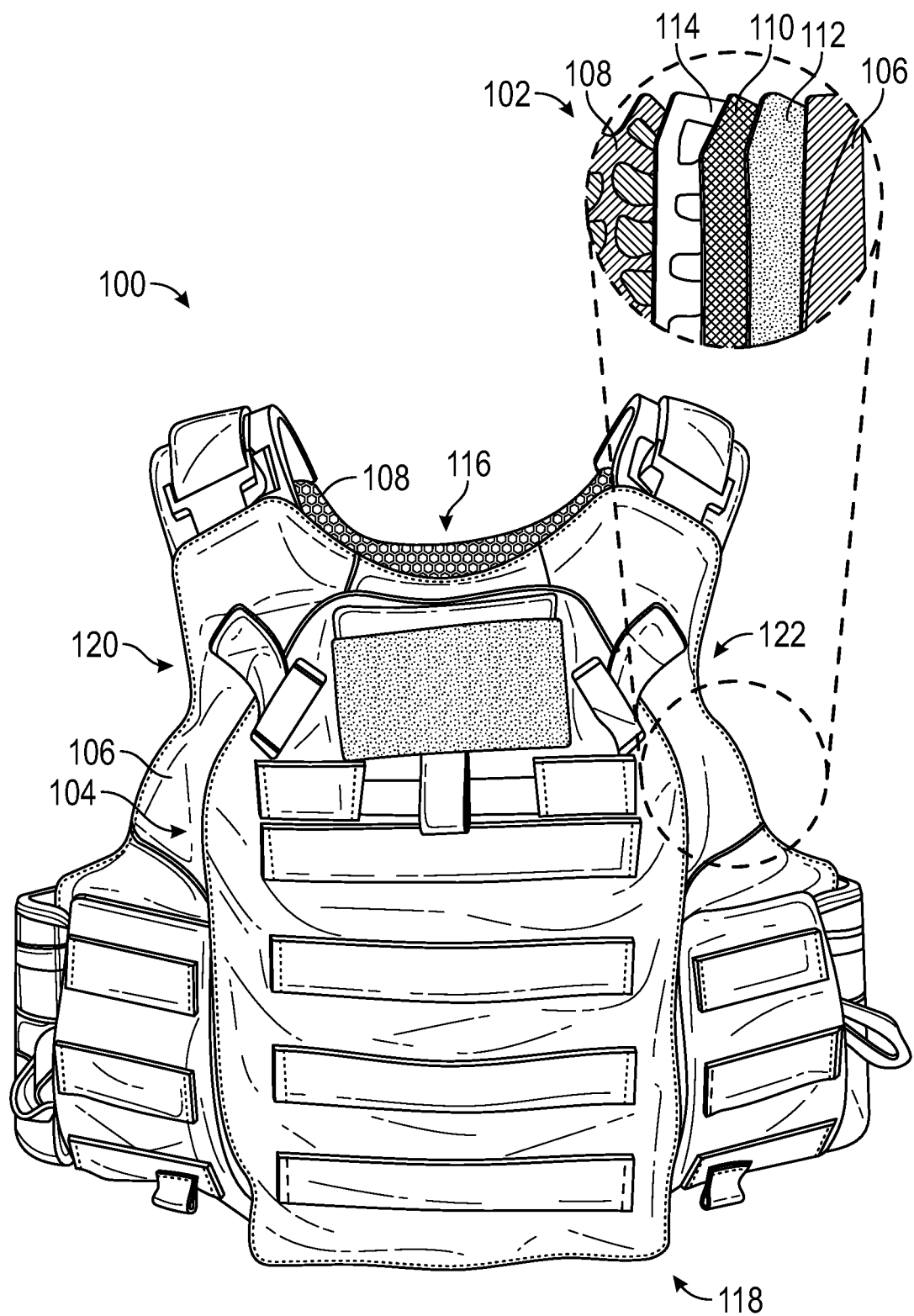
FIG. 1 illustrates an example ballistic vest with interior components shown, including a soft body armor assembly, in accordance with various embodiments.

The detailed description of exemplary embodiments herein refers to the accompanying drawings, which show exemplary embodiments by way of illustration. While these exemplary embodiments are described in sufficient detail to enable those skilled in the art to practice the inventions, other embodiments may be realized, and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Aspects of the present disclosure involve ballistic fabrics or sheets for a soft body armor assembly insertable or otherwise deployed into ballistic protective equipment. In various embodiments and with reference to FIG. 1, a ballistic vest 100 for a wearer incorporating aspects of the presently disclosed technology is shown. Ballistic vest 100 is provided as an example of ballistic protective equipment that may incorporate aspects of the presently disclosed technology and is not intended to be limiting. Other examples of ballistic protective equipment for a wearer (e.g., humans or animals) that may incorporate aspects of the presently disclosed technology, include, without limitation, carriers, belts, cummerbunds, ballistic accessories (e.g., shoulder protection, pouches, abdomen protection, groin protection, leg protection, bicep/deltoid upper arm protection, etc.) and the like. As such, although discussed herein in the context of a ballistic vest, it will be appreciated that the presently disclosed technology applies to other types of ballistic protective equipment as well.

Ballistic vest 100 includes one or more internal components 102 insertable or otherwise disposed in an interior 104 of ballistic vest 100. Interior 104 may be, for example, a pocket or similar enclosure formed by an outer layer 106 and an inner layer 108 of the ballistic vest 100. Outer layer 106 may be exposed to an outside environment and is distal from the inner layer 108 to the wearer of the ballistic vest 100. Stated differently, inner layer 108 faces the wearer and outer layer 106 faces away from the wearer. Outer layer 106 may be made from a lightweight hybrid material with superior abrasion, tear, and fire resistance characteristics, while providing load carriage support and improved durability, particularly in high-wear areas, such as corners, edges, seams, and exposed areas. The lightweight hybrid material of outer layer 106 may be, for example, a laminate of 500-denier nylon and 200-400-denier para-aramid fibers in an ultra-tight weave.

In various embodiments, internal components 102 of ballistic vest 100 may include a soft body armor assembly 110, a ballistic plate 112, and a frame 114. Internal components 102 may increase ballistic protection, decrease side spall and back face deformation, provide structural support to the ballistic vest 100, and/or provide other benefits. Internal components 102 are housed within or disposed in interior 104 of ballistic vest 100. Interior 104 extends between a proximal end 116 and a distal end 118 and a first side 120 and a second side 122. Sides 120-122 may be shaped to accommodate the anatomy and movement of the wearer's arms, and proximal end 116 is shaped to accommodate the anatomy and movement of the wearer's collar and neck area.

Ballistic plate 112 is a hard plate configured to provide ballistic protection against projectiles or shrapnel impacting a strike face of the ballistic plate 112. The strike face is disposed within interior 104 towards outer layer 106, with a back face disposed towards the inner layer 108. In one implementation, a ballistic component (not shown) wraps around at least a portion of a periphery of the ballistic plate 112 to provide additional protection against side spall created by augmentation of the ballistic plate 112. Such as ballistic component improves the structure of the interior 104 and enhances area coverage and range of motion for increased ergonomics and performance. In one implementation, such a ballistic component provides approximately one inch of additional ballistic coverage beyond a front edge of the ballistic plate 112 and approximately 0.5 inches of additional ballistic coverage beyond side edges of the ballistic plate 112.

In various embodiments, frame 114 includes a body configured to improving overall load carriage performance of ballistic vest 100 by providing a rigid platform to add weight. Frame 114 body further reduces fatigue by improving the structure of the ballistic vest 100 by retaining soft body armor assembly 110 in a configuration that prevents bunching and provides support to the ballistic plate 112 to improve edge hit protection. Frame 114 is loose from or otherwise unattached to soft body armor assembly 110 within interior 104. Frame 114 absorbs and otherwise dissipates energy from an impact of a projectile against ballistic plate 112 and/or soft body armor assembly 110. Frame 114 body may be solid or have one or more openings therethrough, as shown in FIG. 1.

Figure 2:
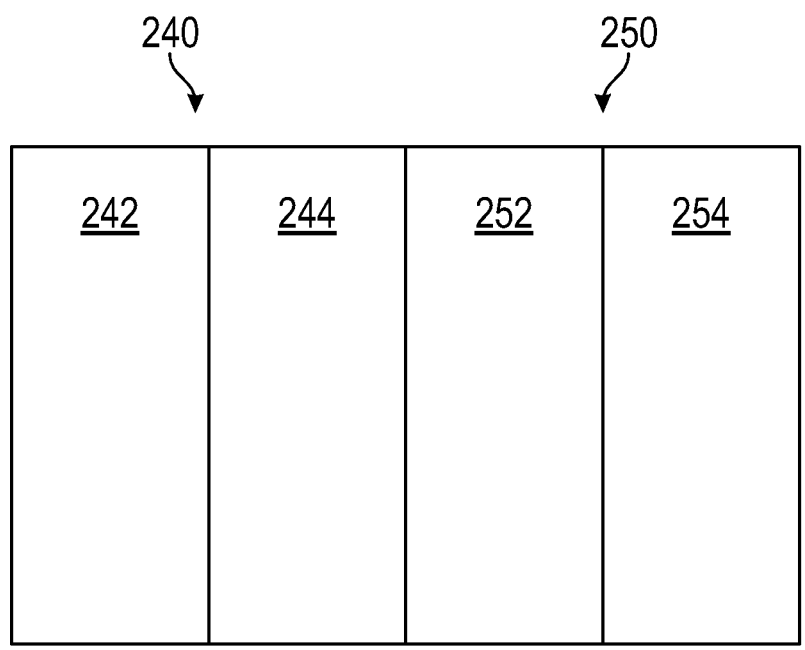
FIG. 2 is a diagram showing example panels of the ballistic fabric or sheets for the soft body armor assembly, in accordance with various embodiments.
Figure 3A:
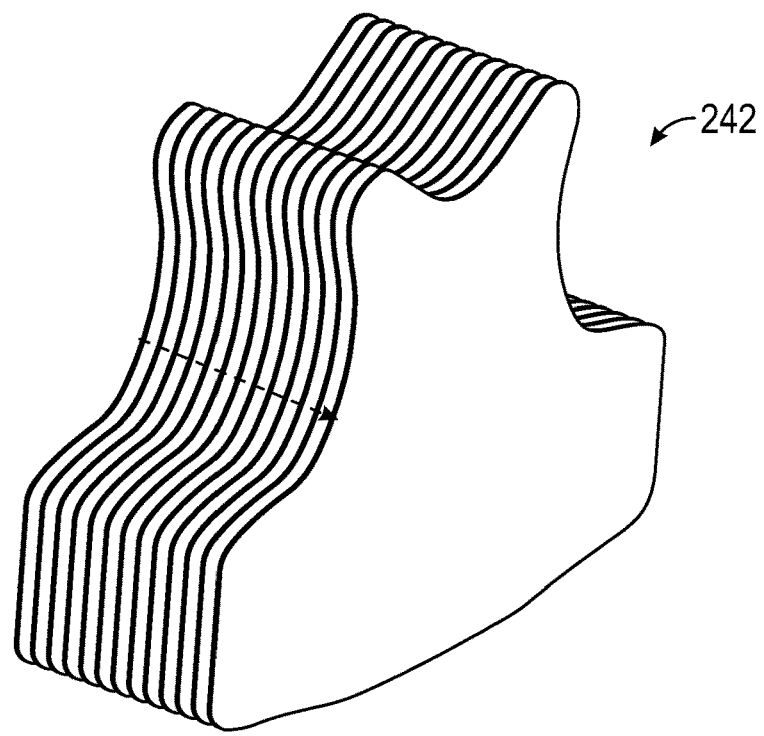
FIGS. 3A-3E illustrate various components of a first subpanel of a soft body armor assembly, in accordance with various embodiments.
Figure 3B:
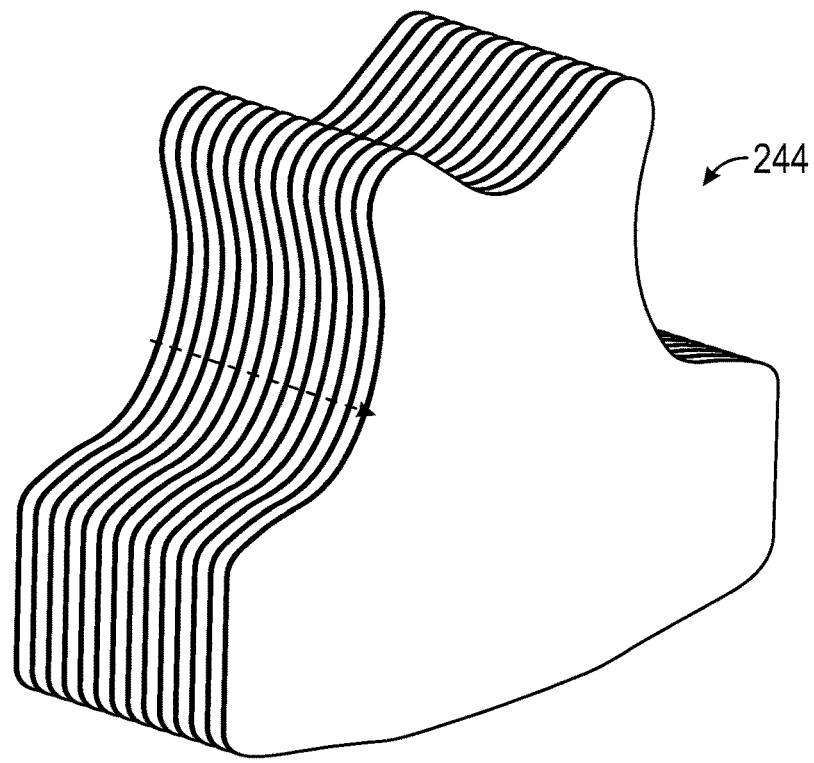
Figure 3C:
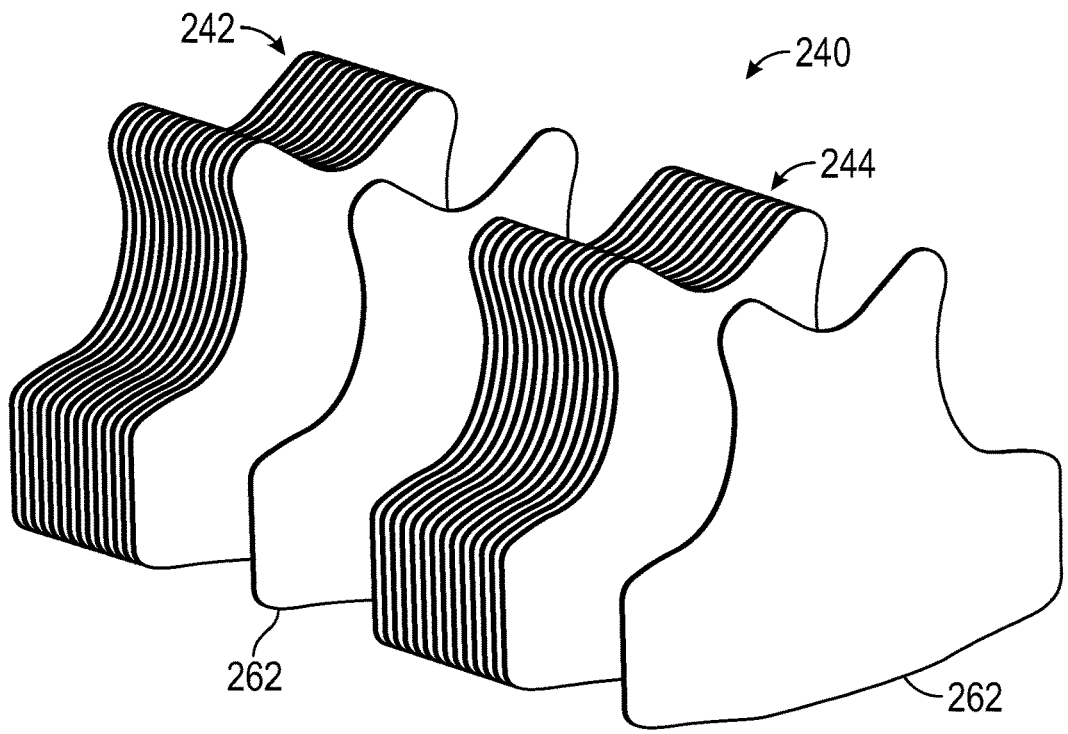
Figure 3D:
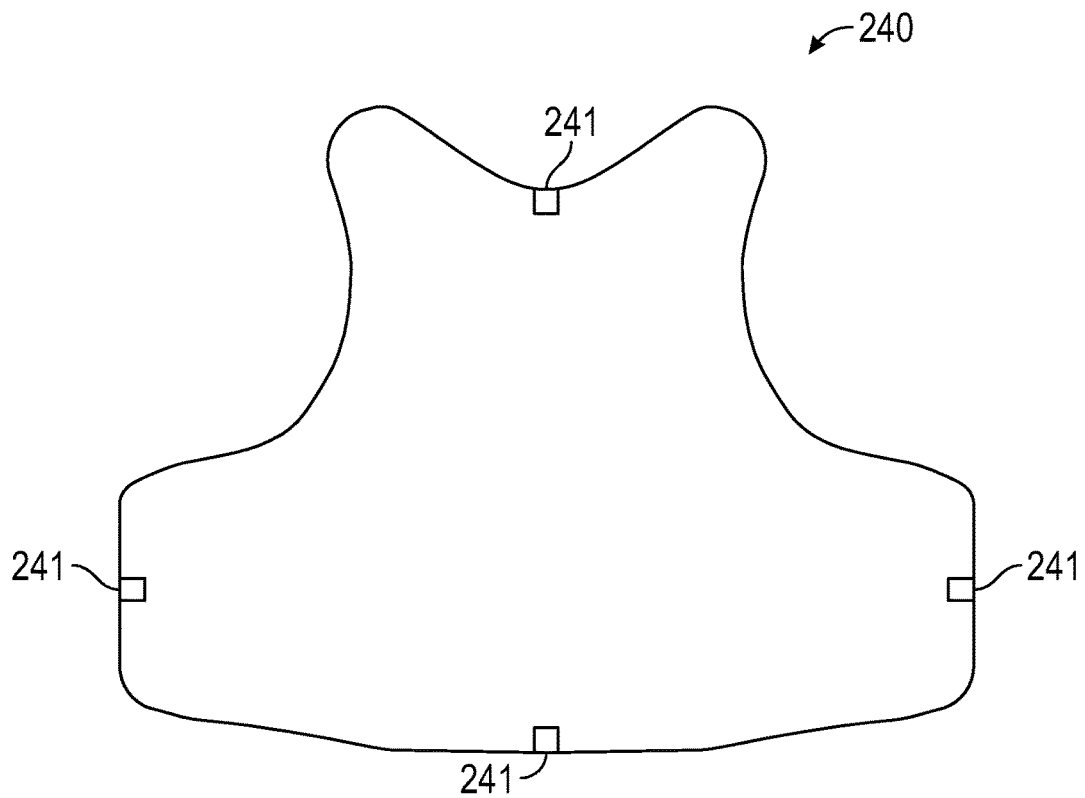
Figure 3E:
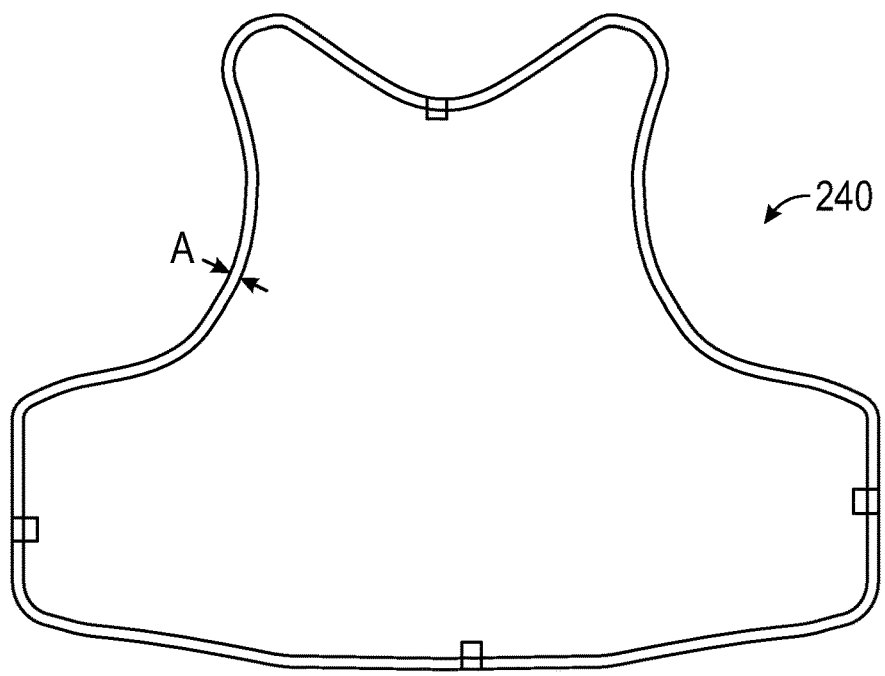
Figure 4A:
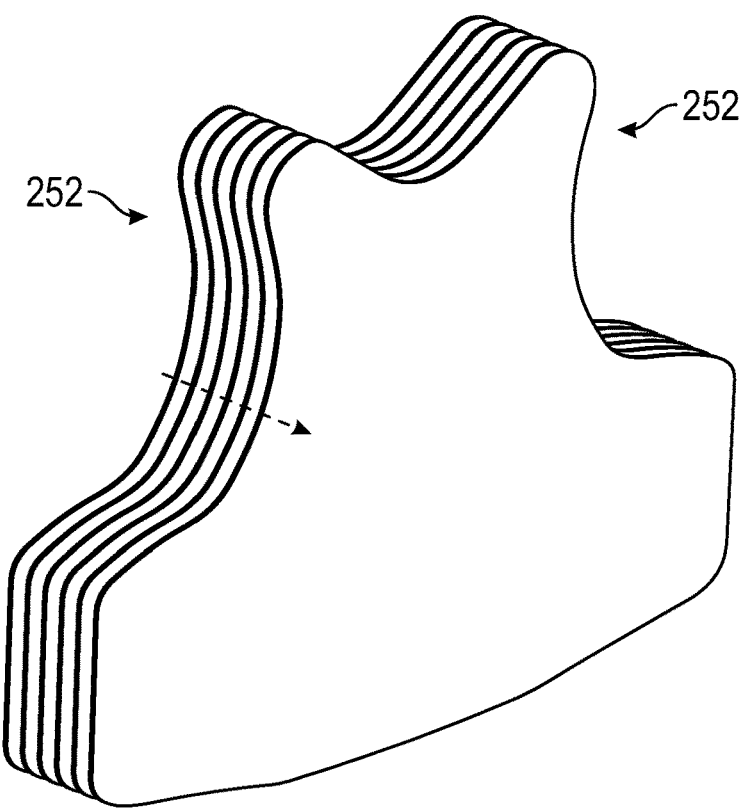
FIGS. 4A-4D illustrate various components of a first portion of a second subpanel of a soft body armor assembly, in accordance with various embodiments.
Figure 4B:
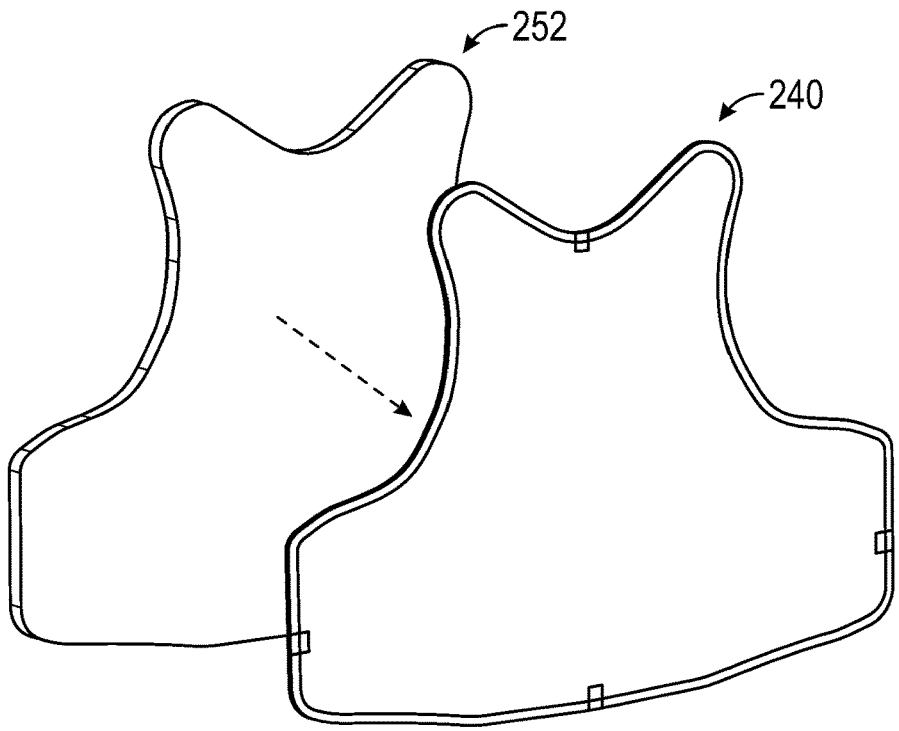
Figure 4C:
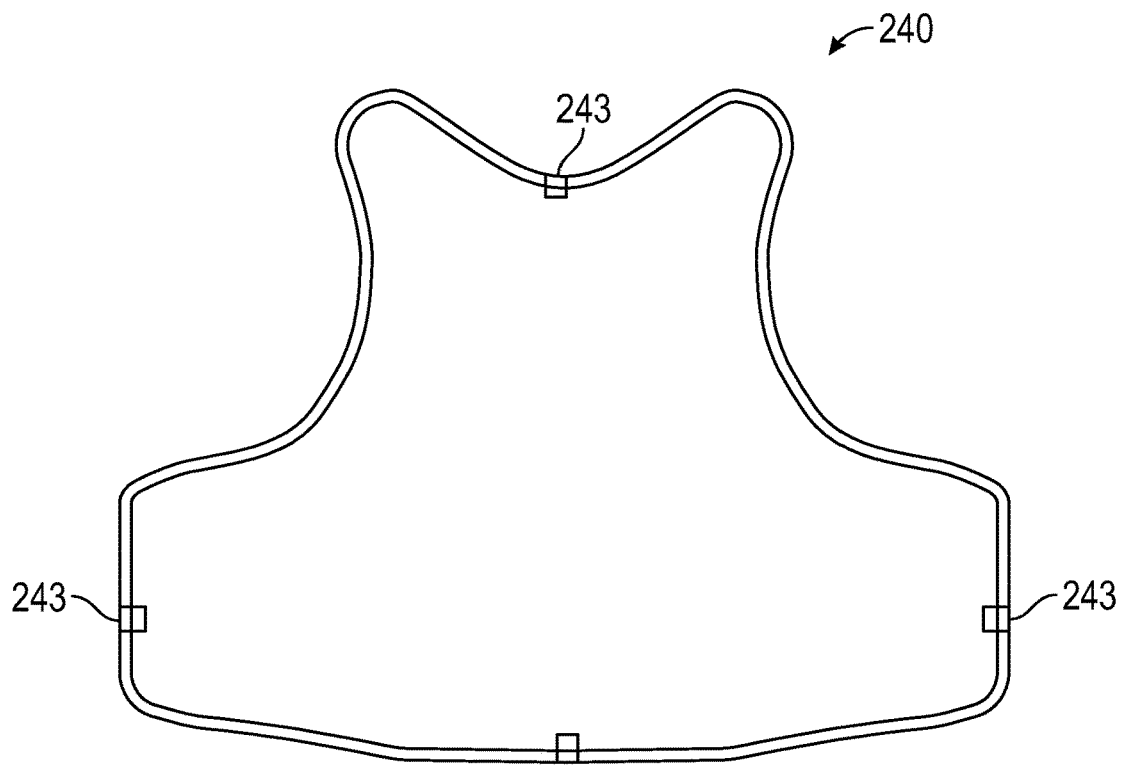
Figure 4D:
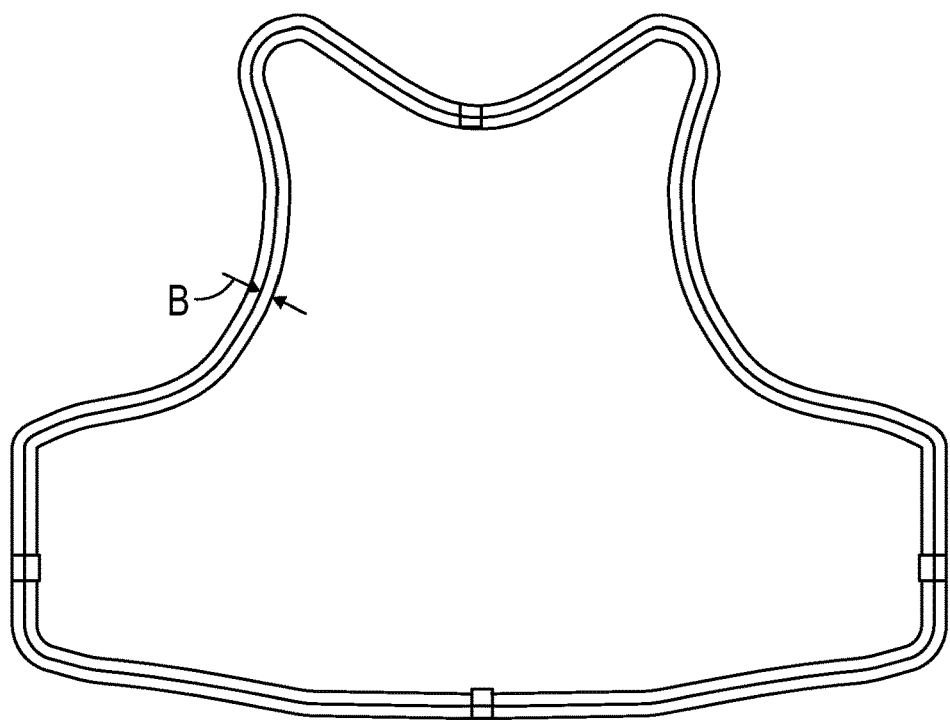

In various embodiments and with reference to FIG. 2, soft body armor assembly 110 includes a first subpanel 240 and a second subpanel 250. First subpanel 240 comprise a first portion 242 and a second portion 244. Second subpanel 250 may comprise a third portion 252 and a fourth portion 254. It will be appreciated that soft body armor assembly 110 may be insertable into or otherwise provided with ballistic protective equipment, such as the ballistic vest 100, or other types of ballistic protective equipment described herein.

Referring to FIGS. 3A-3E, first subpanel 240 may comprise a first portion 242 and second portion 244. First portion 242 may comprise a first plurality of ultra-high molecular weight polyethylene fiber sheets. Each sheet of the first plurality may have two single layers of unidirectional sheets cross plied at substantially 90 degrees to one another. Second portion 244 may have a second plurality of ultra-high molecular weight polyethylene fiber sheets. Each sheet of the second plurality may have two single layers of unidirectional sheets cross plied at 90 degrees to one another. A first layer of an aramid multi-layer woven fabric 262 may be disposed between first portion 242 and second portion 244. A second layer of an aramid multi-layer woven fabric 262 may be applied or disposed on the face the second portion 244. First subpanel 240 may be bound, taped or otherwise assembled together with binding or tape 241. First subpanel 240 may also be sown together. For example, first subpanel 240 may be a sewn panel. In this regard, first subpanel may be stitched about its' perimeter at a distance A from the edge of the first subpanel 240. Distance A may be approximately 0.5 to 0.8 cm. Distance A may also be approximately 0.635 cm. The stitch may have a stitch density of, for example, 4 stitches per inch, 5 stitches per inch, 6 stitches per inch, 7 stitches per inch, 8 stitches per inch, and/or the like.

In various embodiments and with reference to FIGS. 4A-4D, second subpanel 250 may comprise a third portion 252. Third portion 252 may comprise a third plurality of ultra-high molecular weight polyethylene fiber sheets. Each sheet of the third plurality may have two single layers of unidirectional sheets cross plied at 90 degrees to one another. Third portion 252 may be disposed by first subpanel 240. Third portion 252 may be bound or taped to first subpanel 240 with binding or tape 243. First subpanel 240 may also be sown together with third portion 252. In this regard, first subpanel 240 and third portion 252 may be stitched together about their perimeters at a distance B from the edge of the first subpanel 240. Distance B may be approximately 1.0 cm to 1.5 cm. Distance B may also be approximately 1.27 cm. The stitch may have a stitch density of, for example, 4 stitches per inch, 5 stitches per inch, 6 stitches per inch, 7 stitches per inch, 8 stitches per inch, and/or the like.

Figure 5A:
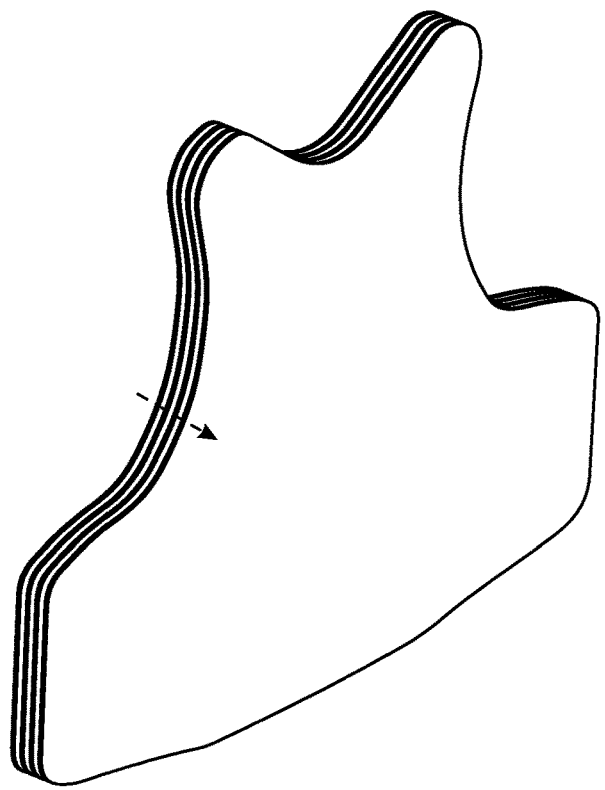
FIGS. 5A-5C illustrate various components of a second portion of a second subpanel of a soft body armor assembly, in accordance with various embodiments.
Figure 5B:
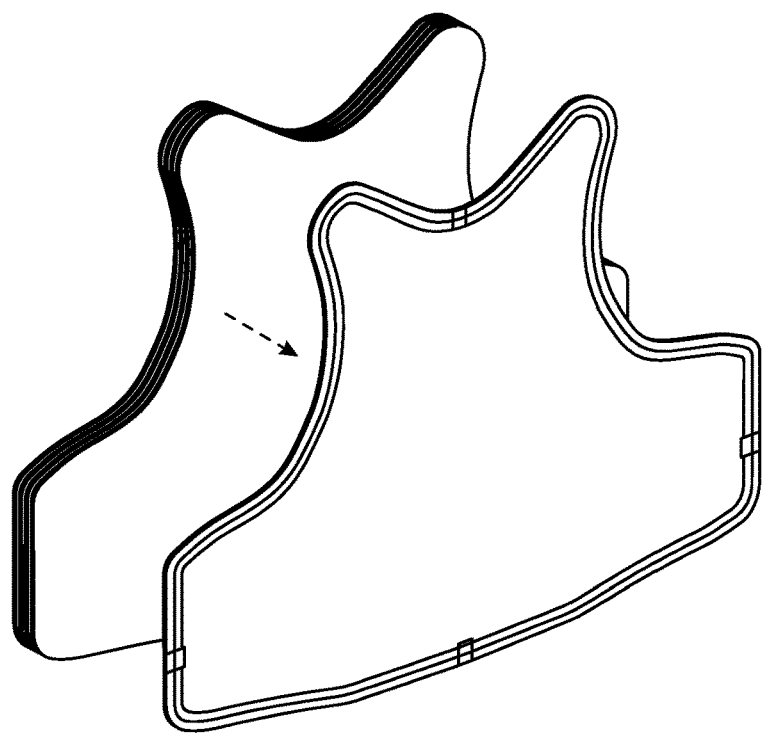
Figure 5C:
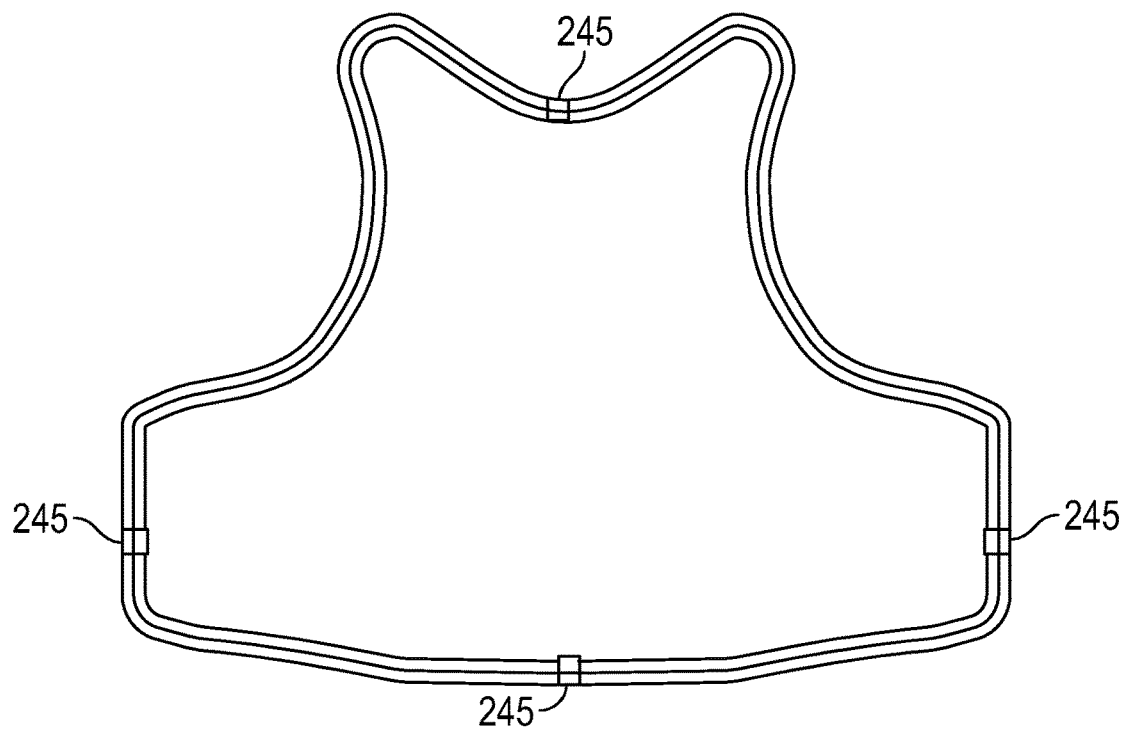

In various embodiments and with reference to FIGS. 5A-5C, second subpanel 250 may comprise a fourth portion 254. Fourth portion may be a plurality of composite sheets. They plurality of composite sheets may be of ultra-light weight; knife, spike and ballistic composite sheets, like those sold by Barrday in connection with the Sparta or Argus brands. The composite sheet may have an areal density of 175 grams per sq. meter. The composite sheet may have an areal density of 320 grams per sq. meter. Fourth portion 254 may be disposed behind the sewn panel of first subpanel 240 and third portion 252. Fourth portion 254 may be bound or taped to the sewn panel with binding or tape 245.

Figure 6A:
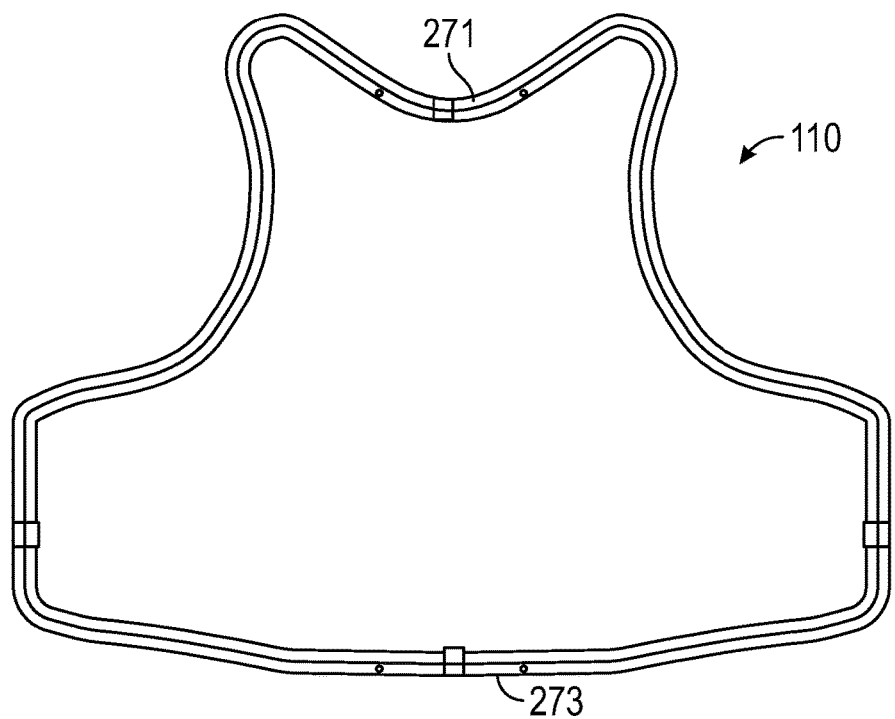
FIGS. 6A-6D illustrate various components of a soft body armor assembly, in accordance with various embodiments.
Figure 6B:
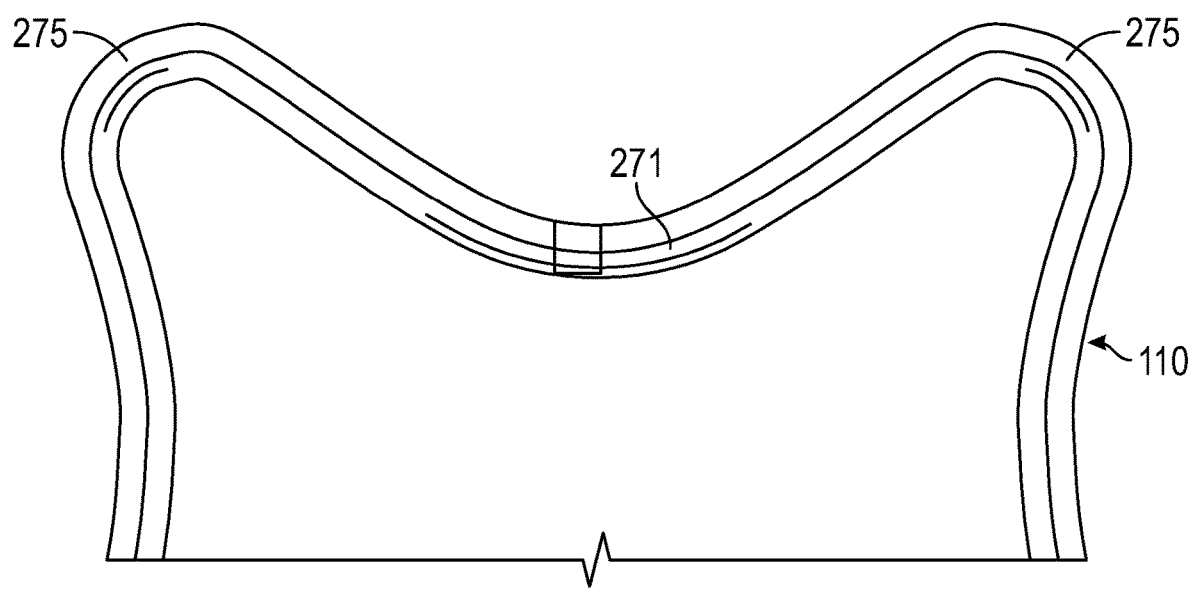
Figure 6C:
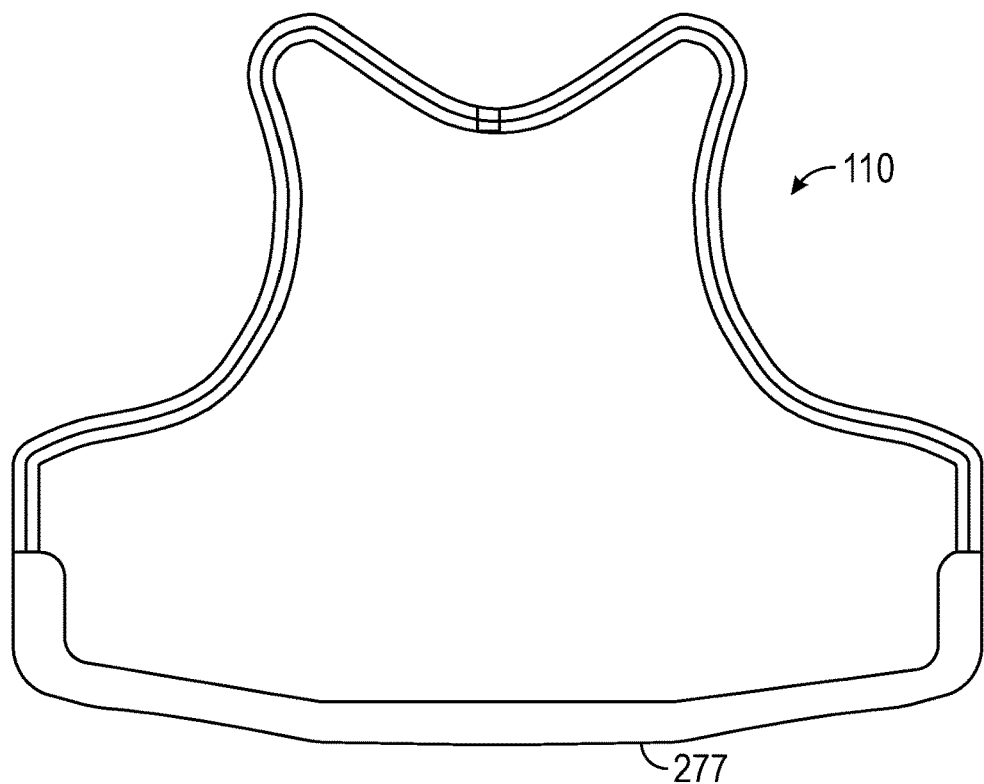
Figure 6D:
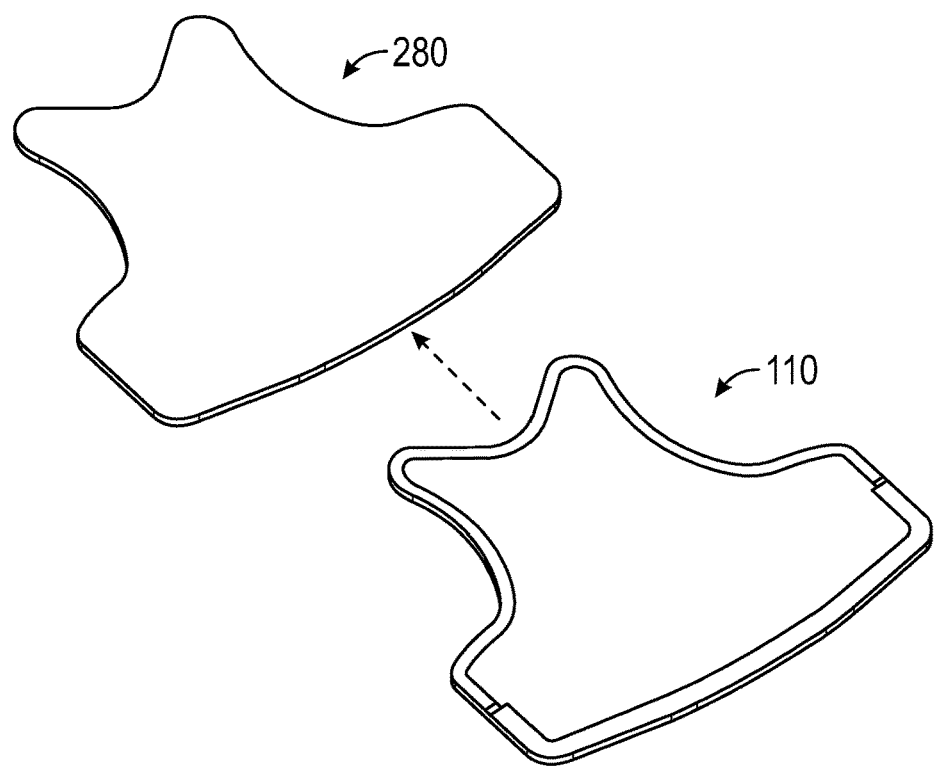
Figure 7A:
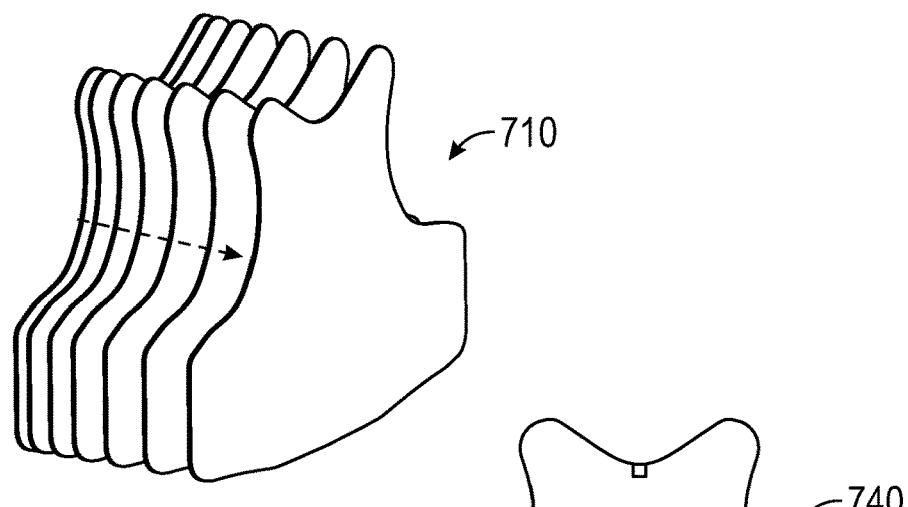
FIGS. 7A-7H illustrate various components of a hybrid soft body armor assembly, in accordance with various embodiments.
Figure 7B:
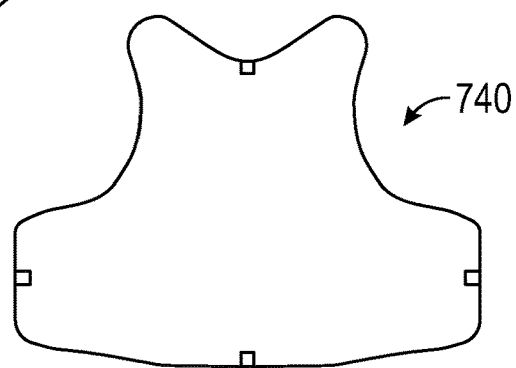
Figure 7C:
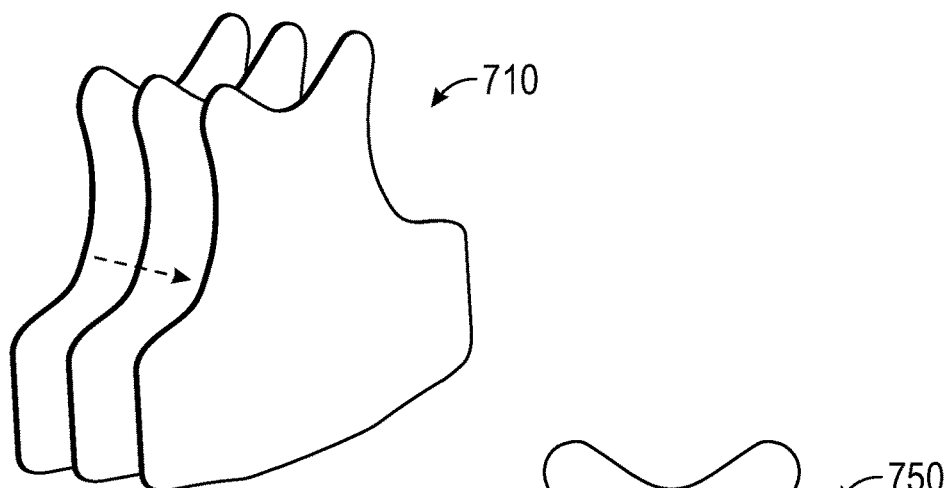
Figure 7D:
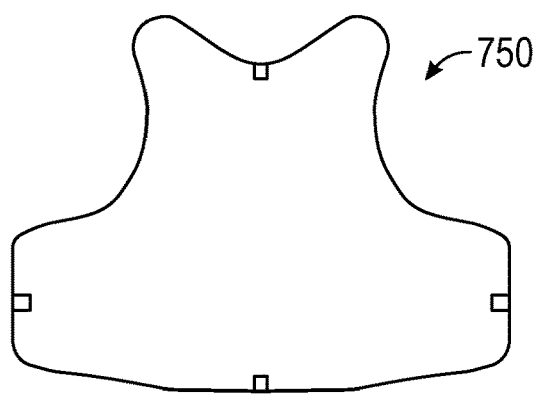
Figure 7E:
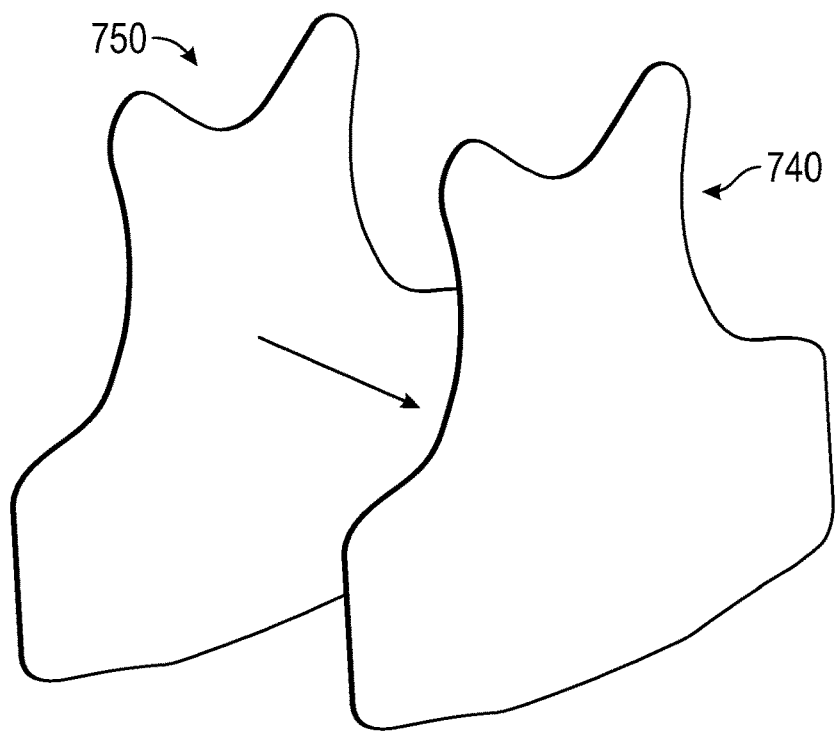
Figure 7F:
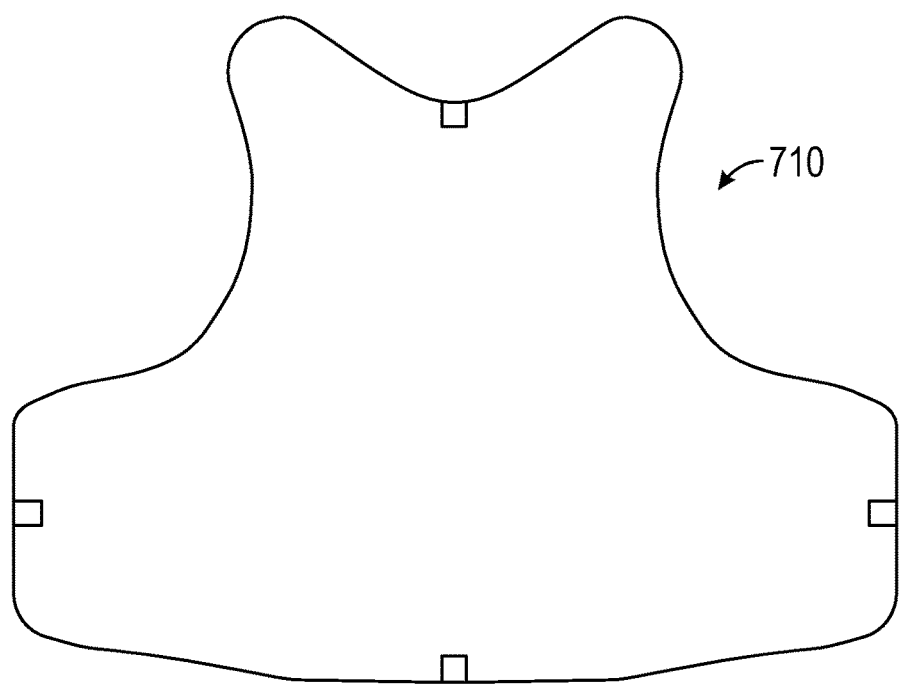
Figure 7G:
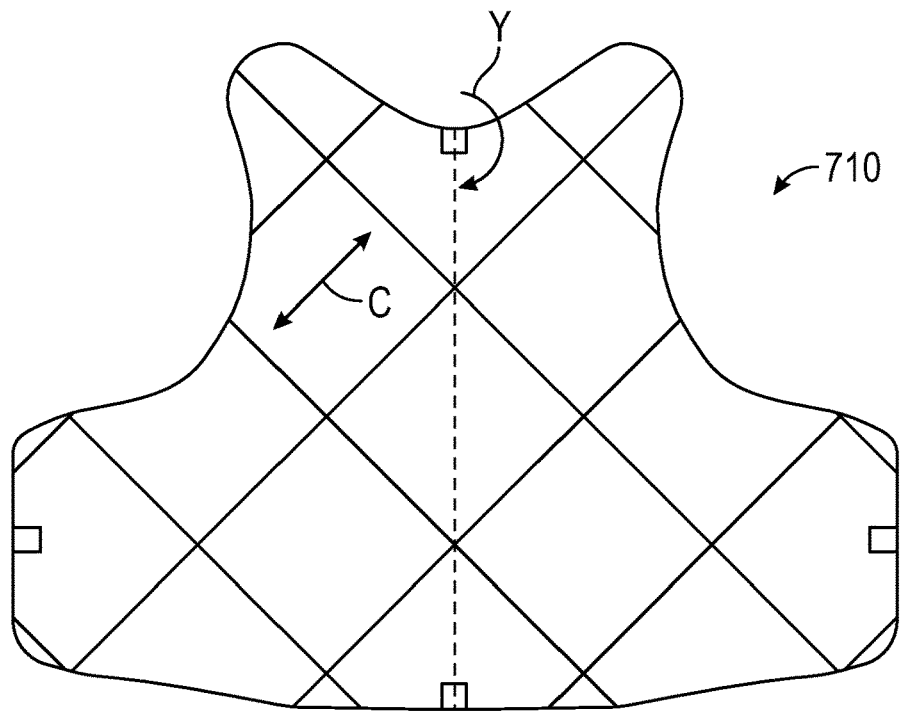
Figure 7H:
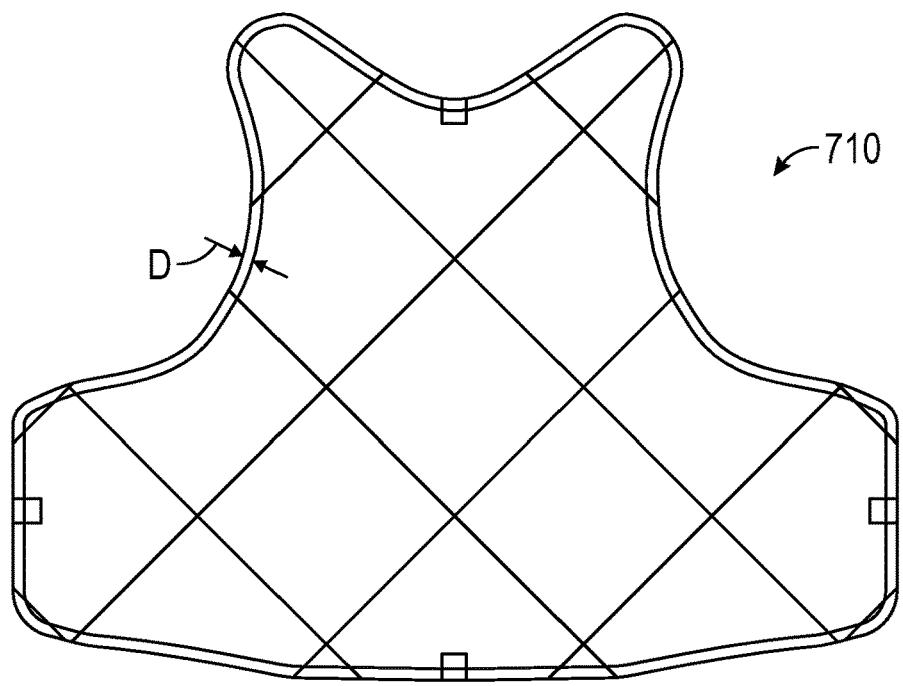

In various embodiments and with reference to FIGS. 6A-6C, soft body armor assembly 110 may be sewn or otherwise bound together at neck portion 271. Soft body armor assembly 110 may also be sewn or otherwise bound together at bottom portion 273. Soft body armor assembly 110 may also be sewn or otherwise bound together at shoulder portions 275. Soft body armor assembly 110 may also be bound together or taped along bottom portion 277. Soft body armor assembly 110 may also inserted into a heat seal pouch 280 shoulder portions 275.

In various embodiments and with reference to FIGS. 7A-7H, soft armor assembly 710 may comprise a first ballistic layup 740 and a second ballistic layup 750. First ballistic layup 740 may have a plurality of sheets of heat-resistant para-aramid synthetic fiber with a molecular structure of many inter-chain bonds (e.g. Kevlar®). Second ballistic layup 750 may have the first plurality of ultra-high molecular weight polyethylene fiber sheets. Second ballistic layup 750 may be disposed behind first ballistic layup 740. Second ballistic layup 750 and first ballistic layup 740 may be taped or bound together as described herein. This assembly may be marked with a grid pattern defined about the centerline Y of the assembly. The grid may defines any suitable pattern, (e.g., rectangles, squares, and of the like) having side that are a length C. Length C may be approximately 9.5 cm to 10.5 cm. Length C may also be approximately 10.16 cm. With first ballistic layup 740 face up, stich the grid pattern (e.g., a 2 inch grid, a 2.5 inch grid, a 3 inch grid, a 3.5 inch grid, a 4 inch grid, a 4.5 inch grid, a 5 inch grid, and/or the like). With second ballistic layup 750 being face up stitch the perimeter of the pattern (e.g., 4 stitches per inch, 5 stitches per inch, 6 stitches per inch, 7 stitches per inch, 8 stitches per inch, and of the like). Distance D may be approximately 0.5 to 0.8 cm. Distance D may also be approximately 0.635 cm.

Figure 8A:
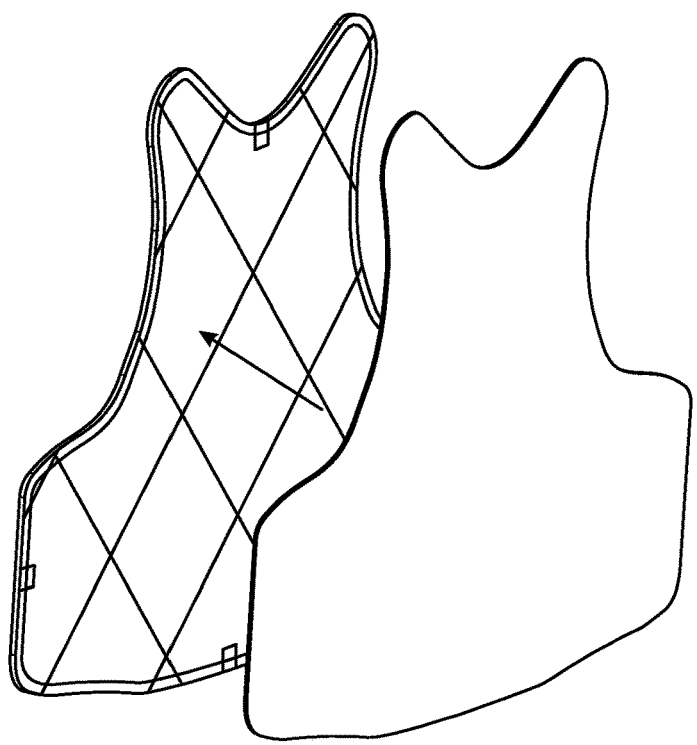
Figure 8B:
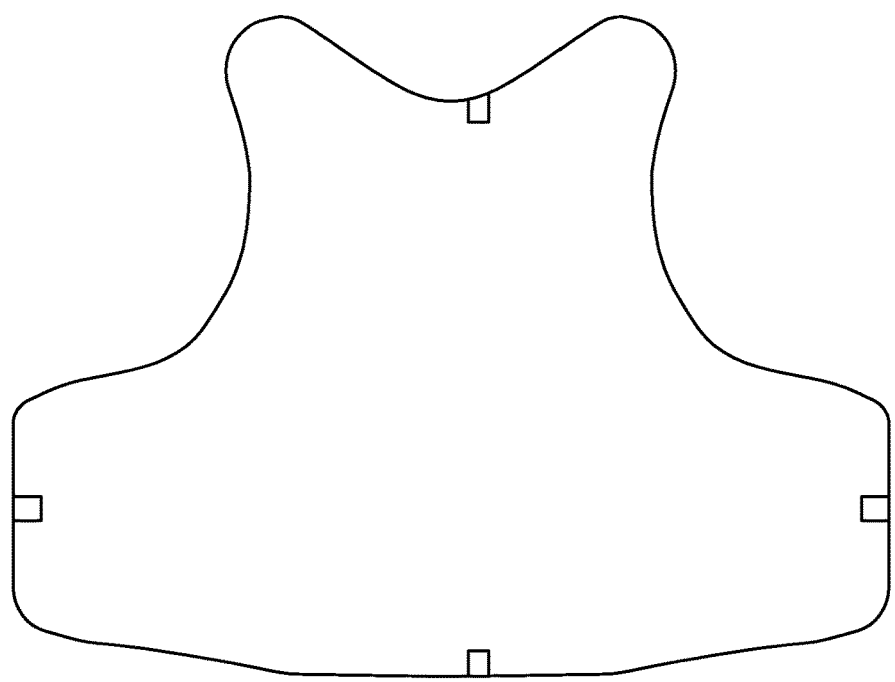
Figure 9C:
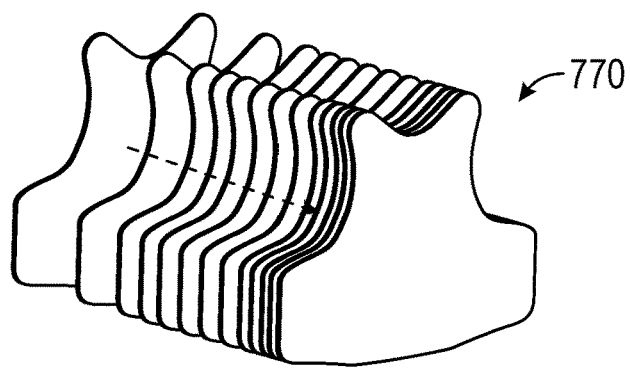
Figure 9D:
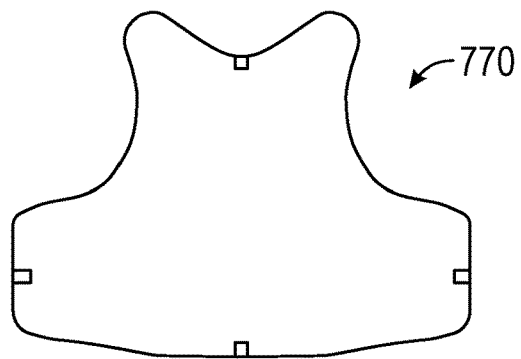
Figure 9E:
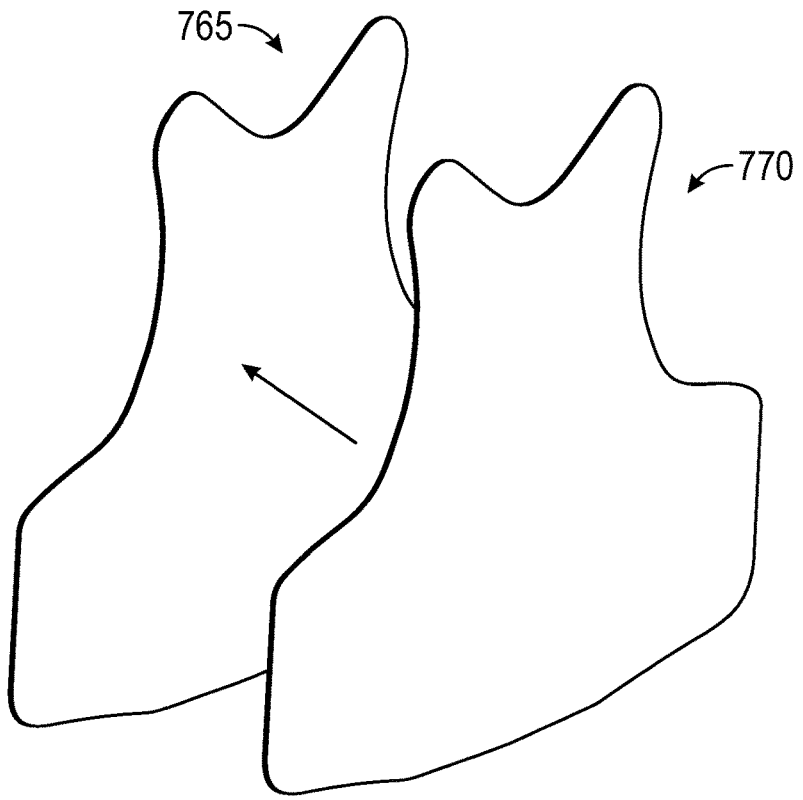
Figure 9F:
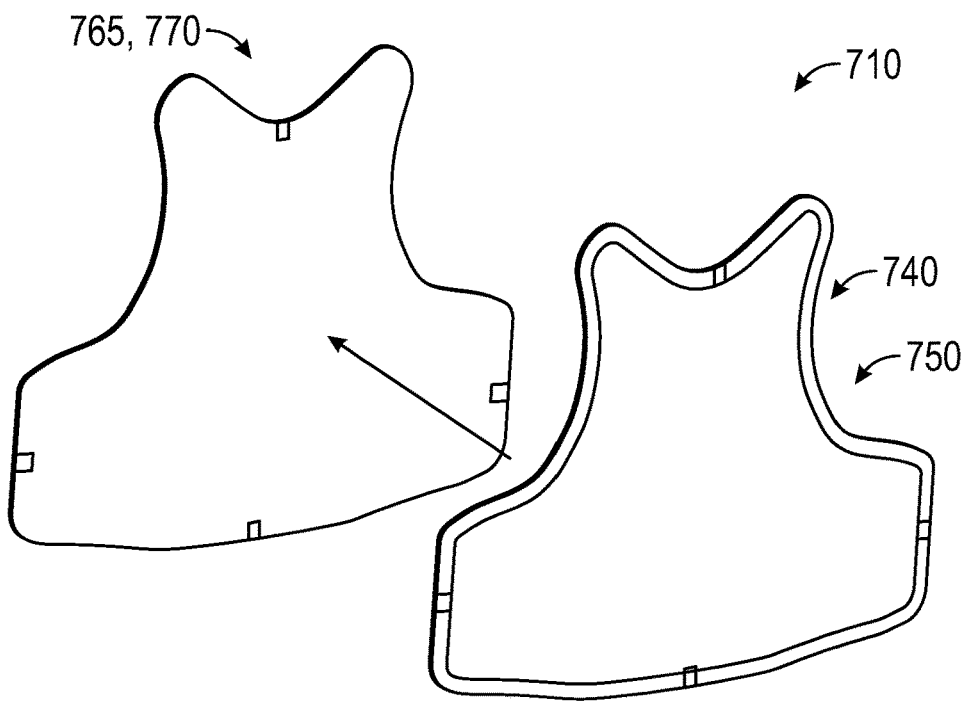
Figure 9G:
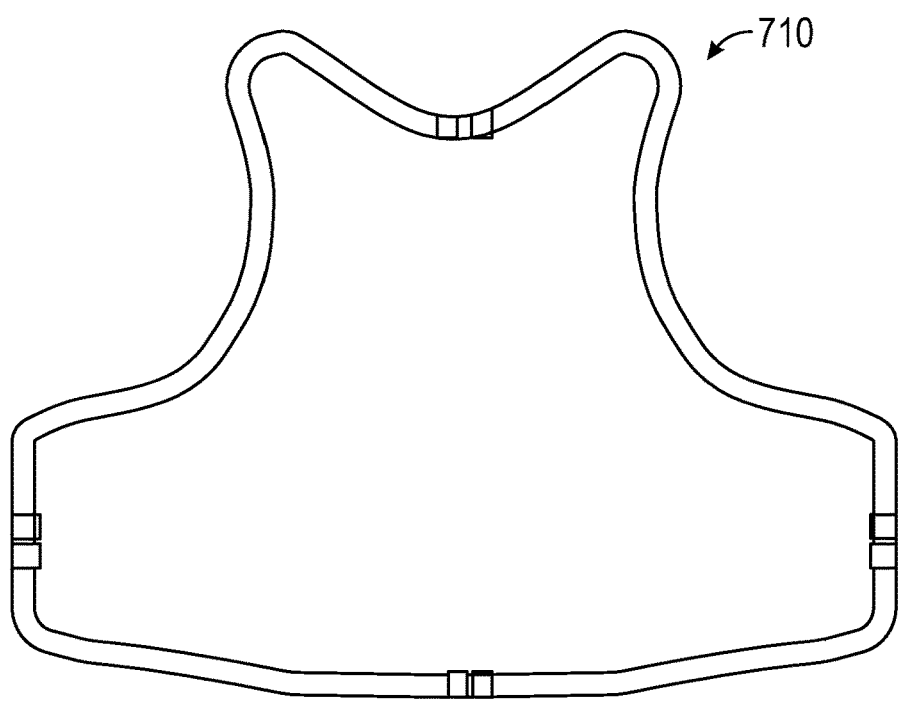
Figure 9H:
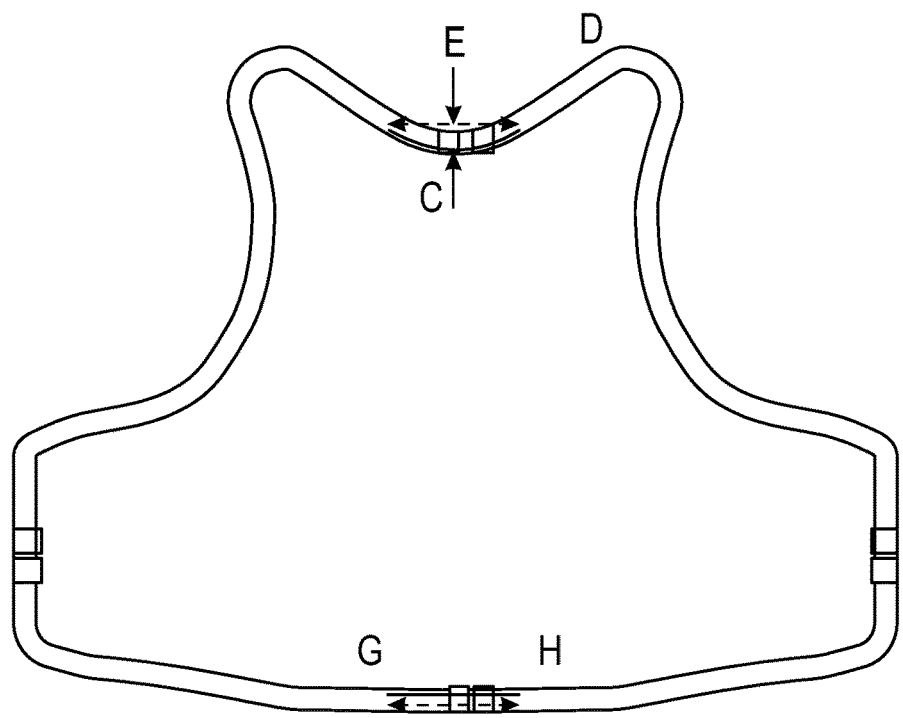
Figure 9I:
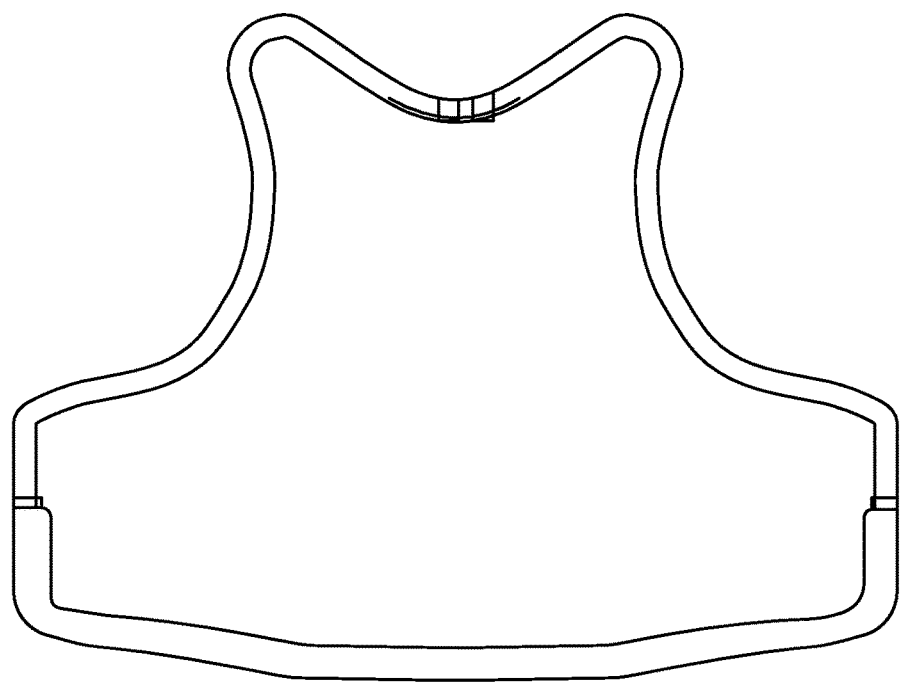

In various embodiments and with reference to FIGS. 8A-8C, soft armor assembly 710 may comprise one or more sheets of monolithic fabric 755 comprising z-directional staple length fibers. Monolithic fabric 755 may be disposed in front of first ballistic layup 740. Monolithic fabric 755 and first ballistic layup 740 may be bound or taped together as described herein. With second ballistic layup 750 facing up stitch the assembly together about the perimeter of the pattern. The stitching is sewn inside the stitched perimeter of the first sewn panel to create a second sewn panel at a distance F. Distance F may be approximately 1.0 cm to 1.5 cm. Distance F may also be approximately 1.27 cm.

In various embodiments and with reference to FIGS. 9A-9G, soft armor assembly 710 may comprise a third ballistic layup 765 having one or more first ultra-high molecular weight polyethylene fiber sheets and a fourth ballistic layup 770 having one or more second ultra-high molecular weight polyethylene fiber sheets. Third ballistic layup 765 may be disposed on top of the fourth ballistic layup 770. The sewn assembly may be disposed behind fourth ballistic layup 770. The assemblies may be taped or bound together as described herein. Soft armor assembly 710 may be optionally taped or sewn in one of more of the neck portion, shoulder portion or bottom portion as described herein.

The soft body armor assemblies described herein provide numerous advantages over monolithic and other designs. For example, soft body armor assemblies are comfortable, durable, flexible, lightweight, and provides increased performance, including resistance to ballistic penetration, back face deformation performance, resistance to mechanical fatigue, and resistance to fragmentation threat, and the like.

The flexible ballistic ply structures may be, for example, a resin impregnated woven fabrics, unidirectional laminates, multi-axial fabrics, and/or the like. In one implementation, the flexible ballistic ply structures can be generated using high strength yarns including, without limitation, aromatic polyamides such as poly(p-phenylene terephthalamide), poly(metaphenylene isophthalamide), p-phenylenebenzobisoxazole, polybenzoxazole, polybenzothiazole, aromatic unsaturated polyesters such as polyethylene terephthalate, aromatic polyimides, aromatic polyamideimides, aromatic polyesteramideimides, aromatic polyetheramideimides and aromatic polyesterimides or copolymers of any of the above mentioned classes of materials, and UHMWPE, or any combination of these yarns. In another implementation, the flexible ballistic ply structures are woven fabrics generated from high strength fiber are woven structures produced using yarns containing aromatic polyamides including poly(p-phenylene terephthalamide), poly(metaphenylene isophthalamide), p-phenylenebenzobisoxazole, polybenzoxazole, polybenzothiazole, aromatic unsaturated polyesters such as polyethylene terephthalate, aromatic polyimides, aromatic polyamideimides, aromatic polyesteramideimides, aromatic polyetheramideimides and aromatic polyesterimides or copolymers of any of the above mentioned classes of materials or any combinations of these yarns.

Any one of the stitch consolidated assemblies of plies for soft body armor assembly described herein is achieved using any stitching thread and any type of stitching method to achieve through-thickness connectivity of the plies, including chain stitching or lock stitching to secure all plies in the assembly together. In one implementation, a stitching pattern that is uniform across the surface of the entire assembly is used. Such a uniform stitching pattern may be, for example, a grid pattern (e.g., quilt pattern), co-linear rows of stitching, concentric circles, a spiral, and/or the like. In another implementation, the stitching pattern of any one of the stitch-consolidated assembly of plies is not uniform across the surface of the entire assembly.

To achieve a desired level of protection, soft body armor assemblies described herein are configured to inhibit the complete penetration of a particular ballistic threat by overcoming the energy associated with the ballistic event. Two examples of commercially available high strength fibers routinely used to generate anti-ballistic ply structures used in soft body armor assembly include para-aramid fiber, such as Kevlar® fiber from Dupont and Twaron® fiber from Teijin, and UHMWPE, including Spectra® fiber from Honeywell and Dyneema® fiber from DSM.

The performance of ballistic protective equipment utilizing ply structures generated from high strength fiber is generally measured based on penetration resistance, as well as the resistance to back face deformation that can lead to blunt trauma injuries. Penetration resistance is routinely reported as the VS0, which is defined as the velocity at which a specific ballistic threat will penetrate an armor construction 50% of the time. A methodology routinely used for determining the VS0 of a particular armor system against a specific threat is outlined in Mil-STD 662F VS0 Ballistic test for Armor and Purchase Description FQ/PD 07-0SG, Body Armor, Multiple Threat/Interceptor Improved Outer Tactical Vest (IOTV) Generation Ill. The methodology for determining back face deformation is outlined in NIJ Standard 0101.06, Ballistic Resistance of Body Armor. As will be understood from the comparative and experimental examples provided herein, the soft body armor assembly for soft body armor assembly 110 meets these standards and provides numerous advantages over monolithic and other hybrid designs. For example, soft body armor assembly 110 is comfortable, durable, flexible, lightweight, and provides increased performance, including resistance to ballistic penetration, back face deformation performance, resistance to mechanical fatigue, and resistance to fragmentation threat, and the like.

Woven fabrics generated using para-aramid fiber have long demonstrated robust ballistic performance as anti-ballistic ply structures used in flexible armor systems. Woven anti-ballistic fabrics rely on mechanical interlacing of yarns using commercial weaving equipment and are a desired when designing systems that provide flexibility, comfort, conformability, and improved breathability. Additionally, the mechanically interlocked woven fabrics are very durable, requiring no adhesives or matrix resins to create the ballistic ply structure. Woven anti-ballistic fabrics and can undergo significant flexural fatigue without losing ballistic performance. Several investigations of flexible body armor fabricated using woven para-aramid fabrics reclaimed after more than a decade of continuous use in the field have demonstrated no ballistic performance loss when compared to the performance of the same designs when first issued.

While mechanical properties of UHMWPE fibers can significantly exceed those of para-aramid fibers such as Kevlar®, woven fabrics generated from UHMWPE fiber have routinely been observed to underperform para-aramid fabrics. One proposition for this observation is that the low friction coefficient of UHMWPE fibers greatly facilitates slip and translation of the warp and fill yarns at the point of impact in woven constructions made therefrom during the ballistic event. This significantly reduces yarn engagement of the ballistic threat, allowing it to pass through the woven structures with limited loading of the UHMWPE yarns.

Unidirectional laminates represent a second type of anti-ballistic ply structure used in the manufacture of flexible body armor systems. Unidirectional laminates are constructed from two or more layers of unidirectionally oriented high strength yarns adhesively bound together using matrix resins and optionally polymer films. The unidirectional fiber layers in the unidirectional laminate are cross-plied; having fiber direction of individual layers rotated 90 degrees relative to the neighboring layers they are laminated to. Unidirectional laminates have demonstrated improved ballistic VSO performance and improved back face deformation performance against high energy deformable projectiles such as bullet threats when compared to woven fabric systems for the same areal density. Disadvantages associated with the unidirectional laminate structure include reduced fragmentation threat resistance, increased stiffness and potentially reduced mechanical fatigue resistance when compared to woven structures generated with the same fiber.

Due to the aforementioned issue associated with its use in woven constructions, the unidirectional laminate was conventionally the preferred anti-ballistic structure for UHMWPE fiber. UHMWPE has found significant commercial success in soft armor systems when used in unidirectional laminate structures. These materials are commercially available under the trade names Spectra Shield® from Honeywell, or Dyneema® Unidirectional from DSM. These unidirectional laminate materials are generated using tacky adhesive matrix resins capable of overcoming the low surface friction and low surface energy of the UHMWPE fiber, resulting in mechanically stable anti-ballistic structures.

While the present disclosure has been described with reference to various implementations, it will be understood that these implementations are illustrative and that the scope of the disclosure is not limited to them. Many variations, modifications, additions, and improvements are possible. More generally, implementations in accordance with the present disclosure have been described in the context of particular examples. Functionality may be separated or combined in blocks differently in various implementations of the disclosure or described with different terminology. These and other variations, modifications, additions, and improvements may fall within the scope of the disclosure as defined in the claims that follow.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A soft body armor assembly, comprising:
   a first subpanel comprising, a first portion and a second portion, the first subpanel comprising a first stitched perimeter defined at a distance A from a peripheral edge of the first subpanel,
   the first portion comprising a first plurality of ultra-high molecular weight polyethylene fiber sheets, wherein each sheet of the first plurality comprises two single layers of unidirectional sheets cross plied at 90 degrees to one another; and
   the second portion comprising a second plurality of ultra-high molecular weight polyethylene fiber sheets, wherein each sheet of the second plurality comprises two single layers of unidirectional sheets cross plied at 90 degrees to one another; and
   a second subpanel comprising a third portion and a fourth portion, the second subpanel is operatively coupled to the first subpanel, the first subpanel and second subpanel comprising a second stitched perimeter defined at a distance B from the peripheral edge of the first subpanel,
   the third portion comprising a third plurality of ultra-high molecular weight polyethylene fiber sheets, wherein each sheet of the second plurality comprises two single layers of unidirectional sheets cross plied at 90 degrees to one another, and
   the fourth portion comprising composite sheets.

2. The soft body armor assembly of claim 1, wherein an aramid multi-layer woven fabric is disposed between the first portion and the second portion.

3. The soft body armor assembly of claim 1, wherein the first portion and the second portion are sewn together.

4. The soft body armor assembly of claim 3, wherein the first portion and the second portion are sewn together about a perimeter of the first subpanel.

5. The soft body armor assembly of claim 1, wherein the third portion is sewn to the first subpanel.

6. The soft body armor assembly of claim 5, wherein the fourth portion is sewn to the first subpanel and the third portion.

7. A ballistic vest, comprising:
   a front plate pocket defined between an inner layer and an outer layer and defining a volume to house a frame and a soft body armor assembly;
   the frame being disposed separate from and adjacent the soft body armor assembly; and
   the soft body armor assembly, comprising,
   a first subpanel comprising, a first portion and a second portion, the first subpanel comprising a first stitched perimeter defined at a distance A from a peripheral edge of the first subpanel,
   the first portion comprising a first plurality of ultra-high molecular weight polyethylene fiber sheets, wherein each sheet of the first plurality comprises two single layers of unidirectional sheets cross plied at 90 degrees to one another,
   the second portion comprising a second plurality of ultra-high molecular weight polyethylene fiber sheets, wherein each sheet of the second plurality comprises two single layers of unidirectional sheets cross plied at 90 degrees to one another, and
   a second subpanel comprising a third portion and a fourth portion, the second subpanel is operatively coupled to the first subpanel, the first subpanel and second subpanel comprising a second stitched perimeter defined at a distance B from the peripheral edge of the first subpanel,
   the third portion comprising a third plurality of ultra-high molecular weight polyethylene fiber sheets, wherein each sheet of the second plurality comprises two single layers of unidirectional sheets cross plied at 90 degrees to one another, and
   the fourth portion comprising composite sheets.

8. The ballistic vest of claim 7, wherein an aramid multi-layer woven fabric is disposed between the first portion and the second portion.

9. The ballistic vest of claim 7, wherein the first portion and the second portion are sewn together.

10. The ballistic vest of claim 9, wherein the first portion and the second portion are sewn together about a perimeter of the first subpanel.

11. The ballistic vest of claim 10, wherein the third portion is sewn to the first subpanel.

12. The ballistic vest of claim 11, wherein the fourth portion is sewn to the first subpanel and the third portion.

13. The soft body armor assembly of claim 1, wherein the distance B is greater than the distance A.

14. The ballistic vest of claim 7, wherein the distance B is greater than the distance A.

* * * * *